US008925057B1

(12) United States Patent
Ansari et al.

(10) Patent No.: US 8,925,057 B1
(45) Date of Patent: Dec. 30, 2014

(54) AUTOMATED TESTS TO DISTINGUISH COMPUTERS FROM HUMANS

(75) Inventors: Nirwan Ansari, Montville, NJ (US); Christopher Andrew Neylan, Silver Springs, MD (US); Amey Bhaskar Shevtekar, Piscataway, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 962 days.

(21) Appl. No.: 12/701,949

(22) Filed: Feb. 8, 2010

Related U.S. Application Data (60) Provisional application No. 61/150,361, filed on Feb. 6, 2009.

(51) Int. Cl.
*H04L 29/06* (2006.01)
*G06F 21/00* (2013.01)
*G06F 21/31* (2013.01)
*G06F 21/36* (2013.01)

(52) U.S. Cl.
CPC ........ *G06F 21/31* (2013.01); *G06F 2221/2103* (2013.01)
USPC ........ 726/7; 726/2; 726/21; 726/26; 382/181; 382/209

(58) Field of Classification Search
USPC ....................... 726/7, 21, 2, 26; 382/181, 209
See application file for complete search history.

(56) References Cited

U.S. PATENT DOCUMENTS

| | | | |
|---|---|---|---|
| 7,891,005 B1 * | 2/2011 | Baluja et al. | 726/26 |
| 2008/0127302 A1 * | 5/2008 | Qvarfordt et al. | 726/2 |
| 2009/0187986 A1 * | 7/2009 | Ozeki | 726/21 |
| 2009/0313694 A1 * | 12/2009 | Mates | 726/21 |

FOREIGN PATENT DOCUMENTS

WO    WO 2008030363 A2 *    3/2008

OTHER PUBLICATIONS

Manar Mohamed, Niharika Sachdeva, Michael Georgescu, Song Gao, Nitesh Saxena, Chengcui Zhang, PonnurangamKumaraguru, Paul C. van Oorschot, Wei-Bang Chen; "A three-way investigation of a game-CAPTCHA: automated attacks, relay attacks and usability"; ASIA CCS '14: Proceedings of the 9th ACM symposium on Information; Jun. 2014; pp. 195-206.*
Elias Athanasopoulos, et al., "Enhanced CAPTCHAs: Using Animation to Tell Humans and Computers Apart" IFIP International Federation for Information Processing 2006, CMS 2006, LNCS 4237, pp. 97-108.

(Continued)

*Primary Examiner* — Andrew Nalven
*Assistant Examiner* — Courtney Fields
(74) *Attorney, Agent, or Firm* — Timothy X. Gibson, Esq.; Gibson & Dernier LLP (57) ABSTRACT

Completely automated tests that exploit capabilities of human vision to tell humans apart from automated entities are disclosed herein. Persistence of vision and simultaneous contrasts are some of the properties of human vision that can be used in these tests. A video of an image is generated in colors that are distinguishable to the human eye but are not easily distinguished numerically. The image includes text manipulated such that positive image data and negative whitespace data occur at equal rates along with a noise component included in each of the video frames. Thus, raw data is made ambiguous while qualities of human visual interpretation are relied upon for extracting relevant meaning from the video.

24 Claims, 10 Drawing Sheets

(56) References Cited

OTHER PUBLICATIONS

Dave Martin, et al., "Detecting Boundaries in Natural Images" charless c. fowlkes—uc berkeley—computer vision group, http://www.cs.berkeley.edu/~fowlkes/project/boundary/index.html., 2 pages.

Jeremy Elson, et al., "Asirra: A Captcha that Exploits Interest-Aligned Manual Image Categorization" CCS'07, 9 pages, Oct. 29-Nov. 2, 2007.

"Human CAPTCHA Breaking" Mar. 11, 2008, pp. 1-6, http://ha.ckers.org/blog/20080311/human-captcha-breaking.

"Good Articles on CAPTCHA" Aug. 22, 2007, pp. 1-7, http://ha.ckers.org/blog/20070822/good-articles-on-captchas/#comments.

Kitten Auth, pp. 1-4, http://thepcspy.com/kittenauth/.

Aleksey Kolupaev, et al., "CAPTCHAs: Humans vs. Bots" IEEE Computer Society, pp. 68-70, Jan./Feb. 2008.

Wen-Hung Liao, "A CAPTCHA Mechanism by Exchanging Image Blocks" 5 pages, IEEE Computer Science, Proceedings of the 18th International Conference on Pattern Recognition (ICPR'06).

David R. Martin, et al., "Learning to Detect Natural Image Boundaries Using Brightness and Texture" 8 pages, Computer Science Division, EECS, U.C. Berkeley.

David R. Martin, et al., "Learning to Detect Natural Image Boundaries Using Local Brightness, Color, and Texture Cues" pp. 530-549, IEEE Transactions on Pattern Analysis and Machine Intelligence, Vol. 26, No. 5, May 2004.

Greg Mori, et al., Recognizing Objects in Adversarial Clutter: Breaking a Visual CAPTCHA, pp. 1-8, Computer Science Division Computer Science Division University of California, Berkeley.

Ned Batchelder., "Stopping Spambots with hashes and honeypots" 21 pages, http://nedbatchelder.com/text/stopbots.html, Jan. 2007.

"PWNtcha—captcha decoder" CACA labs, http://caca.zoy.org/wiki/PWNtcha, Modified Dec. 4, 2009.

Yong Rui, et al., "Excuse Me, But Are You Human?" Microsoft Research, Berkeley, CA, USA, Nov. 2-8, 2003.

AplusWebMaster, "Websense: Google CAPTCHA busted . . . recent spam tactics" 3 pages, SpywareInfo, Home of the BootCamp, http://www.spywareinfoforum.com/topic/113557-websense-google-captc, Feb. 25, 2008.

Mohammad Shirali-Shahreza, et al., "CAPTCHA for Blind People" IEEE International Symposium on Signal Processing and Information Technology, 2007, 995-998.

Mohammad Shirali-Shahreza, et al., "Drawing CAPTCHA" 6 pages, 28th Int. Conf. Information Technology Interfaces ITI 2006, Jun. 19-22, 2006, 475-480.

Mohammad Shirali-Shahreza, et al., "Question-Based CAPTCHA" 5 pages, International Conference on Computational Intelligence and Multimedia Applications 2007, IEEE Computer Society, 54-58.

The Official CAPTCHA Site "CAPTCHA: Telling Humans and Computers Apart Automatically" 4 pages, http://www.captcha.net/ Oct. 11, 2013.

Luis von Ahn, et al., "CAPTCHA: Using Hard AI Problems for Security" E. Biham (Ed.): EUROCRYPT 2003, LNCS 2656, pp. 294-311, International Association for Cryptologic Research 2003.

Luis von Ahn, et al., "Telling Humans and Computers Apart Automatically" Communications of the ACM, vol. 47, No. 2, pp. 57-60, Feb. 2004.

Sui-Yu Wang, et al., "CAPTCHA Challenge Tradeoffs: Familiarity of Strings versus Degradation of Images" 4 pages.

"Contrast effect" Wikipedia, the free encyclopedia, 3 pages, http://en.wikipedia.org/wiki/Simultaneous_contrast, Sep. 5, 2013.

"Persistence of vision" Wikipedia, the free encyclopedia, 4 pages, http://en.wikipedia.org/wiki/Persistence_of_vision, Oct. 4, 2013.

Mark Burnett, et al., "These CAPTCHAs are just not working out" 3 pages, https://xato.net/windows-security/these-captchas-are-just-not-working-out/, Aug. 21, 2007.

Jeff Yan, et al., "A Low-cost Attack on a Microsoft CAPTCHA" pp. 1-19, School of Computing Science, Newcastle University, UK, Apr. 10, 2008.

* cited by examiner

AUTOMATED TESTS TO DISTINGUISH COMPUTERS FROM HUMANS

CROSS-REFERENCE TO RELATED APPLICATIONS

This application claims the benefit of U.S. Provisional Patent Application No. 61/150,361, filed Feb. 6, 2009, the entirety of which is incorporated herein by reference.

FIELD OF THE INVENTION

This invention relates to the field of artificial intelligence (AI) and computer security wherein automated tests are used to distinguish computers from humans.

BACKGROUND OF THE INVENTION

Since their adoption as the primary way to distinguish legitimate users from computers, many types of Completely Automated Public Turing-test to tell Computers and Humans Apart (CAPTCHA) have been developed and proposed. The most basic type of CAPTCHA are question based, such as asking the user to solve a simple math problem (Shirali-Shahreza and Shirali-Shahreze, Question-Based CAPTCHA *IEEE International Symposium on Signal Processing and Information Technology*, December, 13-15, 2007) or asking a question about the question ("how many letters are in the third word of this question?") (http://ha.ckers.org/blog/20070822/good-articles-on-captchas/#comments, viewed June 2008). Sound-based CAPTCHA generate some kind of sound, typically speech, to be interpreted and, perhaps, understood. Examples would be using text-to-speech (TTS) to generate a simple math problem (Shirali-Shahreza and Shirali-Shahreze, CAPTCHA for Blind People, *IEEE International Symposium on Signal Processing and Information Technology*, pp. 995-998, December, 15-18, 2007) or words to be interpreted or replicated (von Ahn, et al, CAPTCHA: Using hard AI problems for security, *Proceedings of Eurocrypt*, 2003).

The most common form of CAPTCHA is the visual CAPTCHA. These tests typically present the user with one or more image and ask a question about the images. Similar to question-based CAPTCHA, visual CAPTCHA adds the extra step of image recognition and interpretation into the test. Examples of visual CAPTCHA are BONGO (L. von Ahn, et al. *CAPTCHA: Using hard AI problems for security, Proceedings of Eurocrypt,* 2003) which displays a series of blocks and asks the user to specify what sets one of the blocks apart from the others. Other kinds of CAPTCHA include those in Liao (A Captcha mechanism by exchange image blocks. *Proceedings of the* 18th International Conference on Pattern Recognition 1179-1183, 2006) which display a familiar image (such as a face) with whole blocks of the image swapped and asks the user to identify the image; PIX disclosed by von Ahn, et al. (CAPTCHA: Using hard AI problems for security. *Proceedings of Eurocrypt,* 2003) which displays a series of similar objects and asks the user to identify what they are; Asirra (A CAPTCHA that exploits interest-aligned manual image categorization. *Proc. of ACM CCS* 2007, 366-374) which displays twelve photos of cats and dogs and asks the user to identify the cats; and KittenAuth (KittenAuth, http://www.thepcspy.com/kittenauth, viewed June 2008) which displays nine images of "cute" animals and asks the user to identify the kittens. Because part of the definition of CAPTCHA is "public", any CAPTCHA that relies on a secret database of images is not considered to be a valid CAPTCHA, since any database is vulnerable to phishing attacks. Asirra uses the ever-changing images database of Petfinder.com, thus fulfilling the accepted definition of CAPTCHA.

A more advanced form of a visual CAPTCHA is an interactive CAPTCHA. This typically involves the user interacting with the CAPTCHA in some way. For example, Shirali-Shahreza and Shirali-Shahreza. (Drawing CAPTCHA. *Proceedings of the* 28th *International Conference Information Technology Interfaces* (ITI 2006), Cavtat, Dubrovnik, Croatia, 475-480, Jun. 19-22, 2006) proposes a Drawing CAPTCHA which proposes a "connect the dots" solution that requires the user to locate three unique points and connect them with clicks of the mouse. Rui and Liu propose HID, which displays a distorted image of a human face and asks the user to click on the corners of the eyes and mouth. (Excuse me, but are you human? *Proceedings of the* 11th *ACM International Conference on Multimedia* (Berkeley, Calif.), ACM, New York, 462-463, 2003). Interactive puzzles typically require the user to understand some kind of instruction about the applet before executing the instruction.

Another advanced form of visual CAPTCHA is an animation-based CAPTCHA, which generate a random animation and presents the user with some kind of task. Athanasopoulos and Antonatos, Enhanced captchas: Using animation to tell humans and computers apart *Proceedings of the* 10th *IFIP Open Conference on Communications and Multimedia Security*, October 2006, propose using an interactive form that requires the user to click on moving objects.

The most common form of a CAPTCHA seen on the web today is the optical character recognition based (OCR-based) CAPTCHA, a variation of visual CAPTCHA. OCR-based CAPTCHA presents the user with a randomly generated image of distorted text to be replicated in a text box. An example of OCR-based CAPTCHA is GIMPY, an implementation upon which most OCR-based CAPTCHA (Yahoo!, Google, Microsoft, etc.) are based. Kolupaev and Ogijenko, CAPTHCAs (Human vs. Bots. *IEEE Security and Privacy,* 6:1, 68-70, January-February, 2008).

Breaking OCR-based CAPTCHA is a computer vision problem, since AI will be applied to locate and recognize cluttered and distorted text. Depending on the implementation, this involves recognizing letters amidst a cluttered background, letters that are warped and/or touching each other, and letters that are segmented with additional lines. Much research has gone toward recognition amidst clutter (Detecting Boundaries in Natural Images, http://www.cs.berkeley.edu/~fowlkes/project/boundary/index.html, viewed June 2008; Martin, et al., Learning to detect natural image boundaries using brightness and texture, *Advances in Neural Information Processing Systems*, vol. 14, 2002; and Martin, et al., Learning to detect natural image boundaries using local brightness, color, and texture cues. *PAMI,* 26(5):530.549, 2004) and the specific breaking of OCR-based CAPTCHA through research and open community efforts (Mori and Malik, Recognizing Objects in Adversarial Clutter: Breaking a Visual CAPTCHA, *CVPR,* 2003; and PWNtcha: The Opensource CAPTCHA Breaker. http://libcaca.zoy.org/wiki/PWNtcha, viewed June 2008). Wang et al., CAPTCHA challenge tradeoffs: Familiarity of strings versus degradation of images. *Proceedings of the* 8th *International Conference on Pattern Recognition,* 164-167 Aug. 20-24, 2006 discussed the ease of use of OCR-based CAPTCHA from a human stand point, finding that humans have a much easier time reading distorted text when it contains familiar words instead of random characters. The most effective tests, however, use random characters to increase effectiveness against dictionary-based attacks (Mori and Malik, supra).

Today's most powerful OCR-based CAPTCHA, that takes advantage of the distortion and squeezing of text, used by Google, Yahoo, and Microsoft, are starting to be cracked with bots with a 20% success rate against Google (SecurityLabs.Websense.com, Google's CAPTCHA busted in recent spammer tactics, Posted on Feb. 22, 2008 by Sumeet Prasad) and a 90% success rate against Microsoft's segmentation method (Hotmail, Windows Live, etc.) with an estimated 60% effectiveness of a full crack implementation (Yan and Ahmad. A Low-cost Attack on a Microsoft CAPTCHA. *Technical Report, School of Computing Science*, Newcastle University, UK. April 2008).

Poor server-side implementation of OCR-based (and other) CAPTCHA systems is a common pitfall. Basing CAPTCHAs off of a standard library of images, poor/predictable naming schemes, and poor/no session-tracking all contribute to the cracking of CAPTCHA systems without the use of computer vision (Xato.com. These CAPTHCAs Are Just Not Working Out. Posted on Aug. 21, 2007 by mb. http://xato.com/bl/2007/08/21/these-captchas-are-just-not-working-out, viewed June 2008). Honeypots also add to the security of the base implementation (Nedbatchelder.com. Stopping spambots with hashes and honeypots. Posted on Jan. 21, 2007 by Ned Batchelder. http://nedbatchelder.com/text/stopbots.html, viewed June 2008). The use of humans to farm answers to CAPTCHAs can be a problem to systems with poor session management and static databases (Ha.ckers.org. Human CAPTCHA Breaking. Posted on Tuesday, Mar. 11, 2008. http://ha.ckers.org/blog/20080311/human-captcha-breaking, viewed June 2008).

In sum, the available CAPTCHAs are broken by attackers with increased frequency by using sophisticated techniques. CAPTCHAs are becoming tougher for humans to solve in order to defeat sophisticated attackers, thereby reducing the utility of the CAPTCHA itself.

SUMMARY OF THE INVENTION

The following presents a simplified summary of the claimed subject matter in order to provide a basic understanding of some aspects described herein. This summary is not an extensive overview, and is not intended to identify key/critical elements or to delineate the scope of the claimed subject matter.

A technique for differentiating humans from computers, the Simultaneous Contrast and the Persistence of Vision CAPTCHA (Completely Automated Public Turing-test to tell Computers and Humans Apart) is proposed. With the steady advancement in Vision/OCR research, popular text-based Turing-tests that generate images of random characters to be reproduced in text-fields are becoming easier to crack, and thus a new type of effective CAPTCHA is called for. The method, while asking the user to replicate the perceived text, takes advantage of two biological qualities of human visual perception: persistence of vision and simultaneous contrast.

Accordingly, a system for user verification is disclosed in accordance with an aspect detailed herein. The system comprises a security component that generates one or more automated tests to tell genuine human users/clients apart from automated entities, such as bots etc. These tests rely on a plurality of human eye/vision properties to differentiate a human user from the automated entities. A communication component associated with the system transmits the tests to one or more access requestors and receives responses from the access requestors. Thus, the security component further comprises a test generation component for generating the automated tests. More particularly, the test generation component can generate a video-based test or video-based CAPTCHA from a target image, wherein the video-based test relies on the human eye properties for the differentiation. In different aspects, the target image can comprise a selection of text including one or more of one or more randomly selected letters or meaningful words. The test generation component further comprises a segmenting component which segments the target image into a grid of segments of predetermined sizes. A color generation component also comprised within the test generation component generates or selects a set of colors for manipulating the target image based at least on one of the plurality of human eye properties. For example, the set of colors can include at least three colors such that positive and negative data in the target image are visually differentiable while being numerically ambiguous. The test generation component further comprises a frameset generation component for generating at least one frameset for the video CAPTCHA. The frameset generation component can further comprise a color mapping component that determines which pixels of the target image are positive and where to put negative whitespace data prior to generating the frameset and/or a noise generation component that introduces noise into each frame of the frameset. Thus, the frameset generation component generates a frameset comprising equal rates of positive data along with the negative whitespace data in addition to negative non-whitespace data.

A method of user verification and computer readable media with instructions thereon to execute the method are also disclosed in accordance with different aspects. When an access request is received, one or more tests that factor in properties of human eye/vision, such as persistence of vision and simultaneous contrast, are issued to the access requestor. Based on the response received from the requestor it can be verified if the requestor is a human user or an automated entity. In a more detailed aspect, a video based automated test, such as a video-based CAPTCHA, is issued. A video of a target image comprising text data of one or more of randomly selected letters or meaningful words is generated. The target image is then segmented into a grid wherein each segment is of a predetermined size. A set of colors for inclusion into the target image in the video is also generated or selected such that positive and negative data in the target image are visually differentiable while being numerically ambiguous. In a particular aspect, the set of colors can comprise three or more colors that exploits simultaneous contrast characteristic of a human eye. The grid of segments is then split across a plurality of framesets such that occurrence rates of the positive data comprising the target image or the text data and negative data including the whitespace data is the same. A noise component is further added to each segment in a deterministic way which leads to reduced visibility of the text in each frame, but identifiable by a human user when combined in a frameset and shown as a video CAPTCHA.

BRIEF DESCRIPTION OF THE DRAWINGS

To assist those of ordinary skill in the relevant art in making and using the subject matter hereof, reference is made to the appended drawings, wherein.

It should be noted that the appended drawings illustrate only typical embodiments of this invention and are therefore not to be construed as limiting of its scope, for the invention may admit to other equally effective embodiments. Where possible, identical reference numerals have been inserted in the figures to denote identical elements.

DETAILED DESCRIPTION OF THE INVENTION

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, or a computer. One or more components may reside within a process and/or thread of execution and a component may be localized on one computer and/or distributed between two or more computers.

Aspects of the claimed subject matter may be implemented as a method, apparatus, or article of manufacture using standard programming and/or engineering techniques to produce software, firmware, hardware, or any combination thereof to control a computer to implement various aspects of the claimed subject matter. The term "article of manufacture" as used herein is intended to encompass a computer program accessible from any computer-readable device, carrier, or media. For example, tangible computer readable media can include but are not limited to optical disks (e.g., compact disk (CD), digital versatile disk (DVD), etc.), smart cards, magnetic storage devices (e.g., hard disk, floppy disk, magnetic strips, etc.), and flash memory devices (e.g., card, stick, key drive, etc.). Of course, those skilled in the art will recognize many modifications may be made to this configuration without departing from the scope or spirit of what is described herein.

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" in various places in the specification are not necessarily all referring to the same embodiment.

With increasing numbers and varieties of web services that become available to Internet users comes greater need to effectively combat automated bots that intend on abusing these new services. Thus, developers are beginning to rely on completely automated public Turing-tests to tell computers and humans apart (CAPTCHA) in order to distinguish legitimate human clients from malicious automated programs. Hence, embodiments described herein provide an effective defense by using novel techniques to design a video CAPTCHA.

The formal definitions of CAPTCHA were proposed by von Ahn et al. (Telling humans and computers apart (automatically). *CMU Tech Report* CMUCS-02-117, February 2004). They proposed the use of modern hard artificial intelligence (AI) problems for security. They postulated that by using hard AI problems for security will provide increased motivation for researchers and hackers to break the CAPTCHA, thereby solving the AI problems and advancing the field, similar to how advances in cryptography has had a positive impact on the field of computational number theory.

Figure 1:
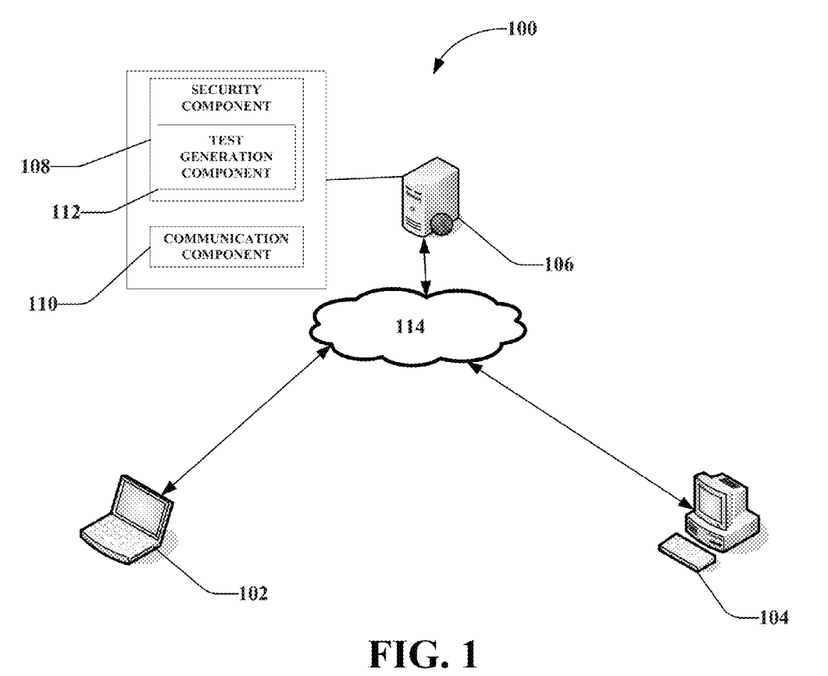
FIG. 1 depicts a system for identifying a user in accordance with one or more aspects disclosed herein.

Referring now to FIG. 1, a system 100 for identifying a user in accordance with the present disclosure comprises computers 102, 104 accessing resources on a third computer 106 via a network 114. In accordance with different aspects, the computers 102, 104 can be connected as clients to a server 106 via the Internet 114 or they may be connected as peers via a local network (not shown). The computer 106 implements a security/verification component 108 and a communication component 110. The security component 108 is employed to confirm that the access requests were received from humans rather than automated programs, for example, bots. In addition to other security features, the security component 108 can further comprise a test generation component 112 to generate an automated test to tell a human user apart from an automated program. Although the test generation component 112 is shown as part of the security component 108, it can be appreciated that this is not necessary. The test generation component 112 can be a separate entity located on the same computer 106 as the security component 108 or it may be located on a separate computer (not shown) networked to the computer 106. In a further aspect, the test generation component 112 generates a video based test that relies on human eye properties to differentiate a human user from an automated entity. The test is transmitted to the access requestors 102 and 104 via the communication component 110 and based on the responses received from access requestors 102 and 104, it can be differentiated if the entity requesting access to resources is a human user or an automated program being executed on the machines 102/104.

In different embodiments the test generation component 112 generates a video based CAPTCHA. The method involved therein adds a level of abstraction to OCR-based CAPTCHA (Kolupaev and Ogijenko., CAPTHCAs, Human vs. Bots. *IEEE Security and Privacy*, vol. 6, issue 1, 68-70, January-February, 2008; The Official CAPTCHA Website, http://www.captcha.net, viewed June 2008; von Ahn et al., CAPTCHA: Using hard AI problems for security, *Proceedings of Eurocrypt*, 2003, the entireties of which are incorporated herein by reference), with the intent of making the raw data ambiguous while relying on qualities of human visual interpretation to extract relevant meaning from the generated video. When added to the relatively low success rates of cracking current OCR-based image CAPTCHA systems, the added complexity of the methods detailed herein will require further intensive computation to attempt relevant information extraction thus creating a powerful new security system and the addition of such creates a synergistic level of improvement over existing technology. A potential attacker, assuming proper server-side implementation, will have to analyze each frame of the frameset in the video against each other frame with the intention of discovering a pattern between noise and positive/negative data. The attacker would have to successfully extract the positive data from the frameset with minimal negative data in order to proceed with standard OCR.

Certain embodiments which will be detailed infra, rely on human eye properties to fool an attacker which relies on technology to break the CAPTCHA. Various embodiments utilize video-based CAPTCHA as an extension of the image-based CAPTCHA that requires the user to read text and reproduce it in a text box, with the added feature of video of text. The method involved in these embodiments adds a level of abstraction to OCR-based CAPTCHA with the intent of making the raw data ambiguous while relying on qualities of human visual interpretation to extract relevant meaning from the generated video.

The human eye has many unique capabilities/properties, among which are persistence of vision and simultaneously contrasts. Thus, various embodiments relate to a video-based CAPTCHA that will take advantage of the human ability to process rapidly displayed discrete images as continuous animation (persistence of vision) and the human eye's tendency to interpret colors differently depending on what colors surround them (simultaneous contrast). Modern theatrical film runs at 24 unique frames per second (FPS) with each frame being displayed for 2 or 3 flickers, essentially displaying 48 FPS or 72 FPS. These 24 images are obviously discrete, but our brain interprets them as continuous and flowing motion. This phenomenon is attributed to persistence of vision, by which nanoseconds of exposure to a light produces microseconds of sight reaction in our eyes and brain.

Figure 2:
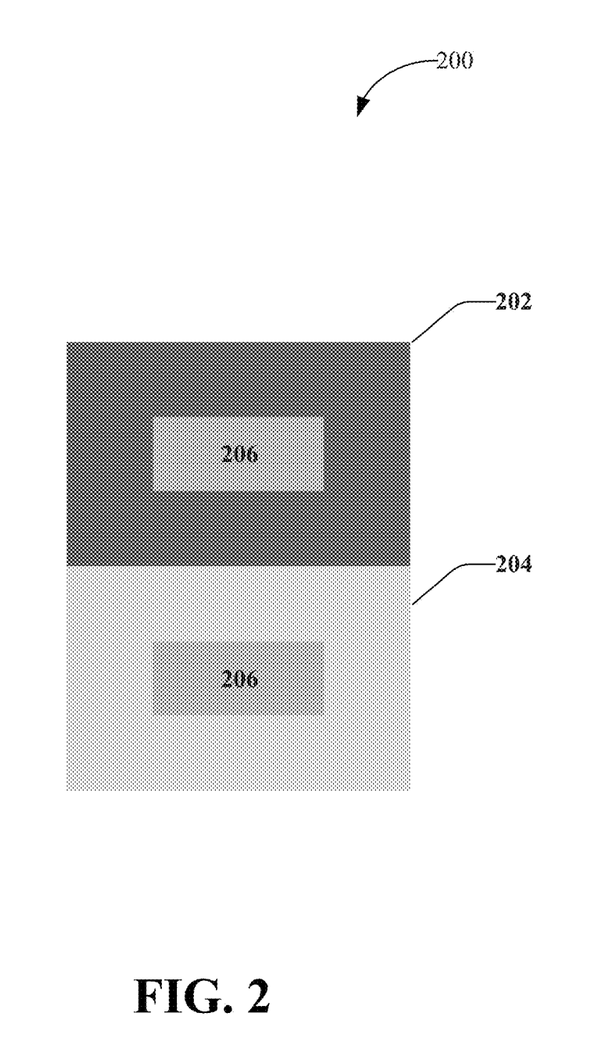
FIG. 2 shows another property, simultaneous contrast, relied upon in the exemplary tests to tell humans and computers apart.

FIG. 2 shows another property, simultaneous contrast, relied upon in the tests to tell humans and computers apart. The FIG. 200 displays three unique colors within two blocks 202 and 204. However per simultaneous contrast's effect, the middle color 206 appears different in 202 as compared with 204 despite being the same. Simultaneous contrast, or contrast effect, is the enhancement or diminishment, relative to normal, of perception, cognition and related performance as a result of immediately previous or simultaneous exposure to a stimulus of lesser or greater value in the same dimension. Here, normal perception or performance is that which would be obtained in the absence of the comparison stimulus—that is, one based on all previous experience.

Certain embodiments of this technology of CAPTCHA involve a displaying a video. Different aspects can relate to displaying a text of random characters, or meaningful words or other images. An exemplary embodiment can start with an image of text to interpret, called the target image, which can be divided into a grid of segments that will be split across the frames of the video. Only part of the text can be displayed in any given frame. As the human eye only retains information for approximately 0.05 seconds, most or all the image/text must be displayed at that interval to be decipherable.

Figure 3:
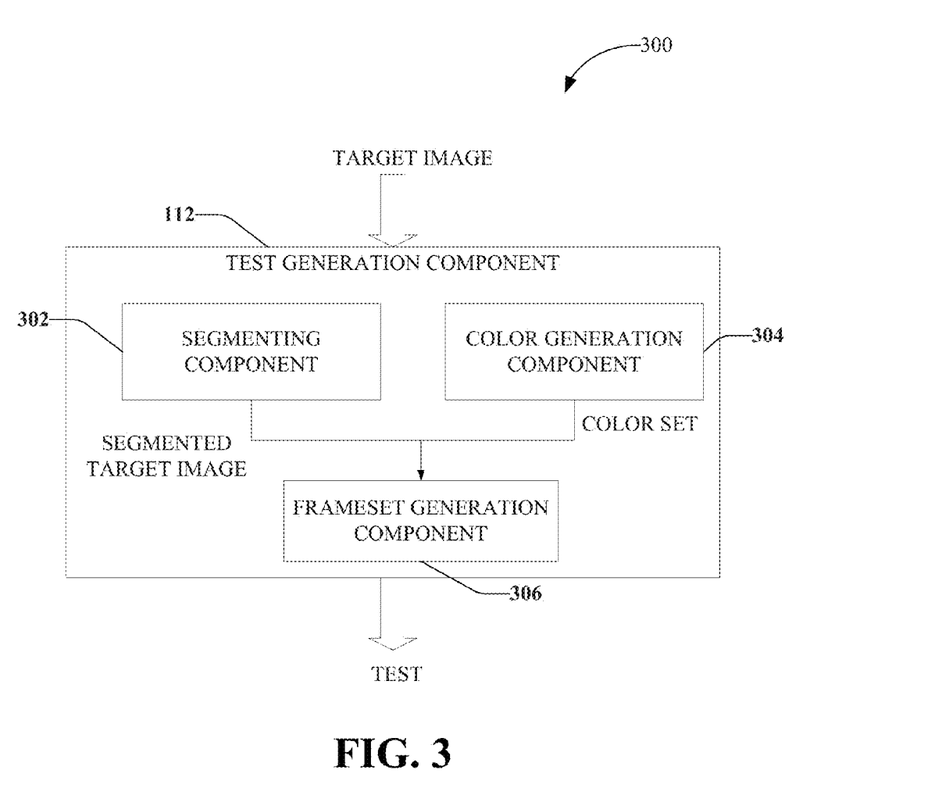
FIG. 3 is a schematic diagram of a test generation component in one aspect disclosed herein.

Accordingly, FIG. 3 is a schematic diagram 300 of the test generation component 112 in one exemplary aspect. The test generation component 112 can comprise a segmenting component 302, a color generation component 304 and a frameset generation component 306. It can be appreciated that the various components are shown as separate entities as means of illustration and not limitation and that the functionality ascribed to these components can be achieved by more or less number of components. The test generation component 112 can receive as input, a target image comprising one or more of text or other images. If the image comprises text, such text can include one or more meaningful words or randomly generated grouping(s) of alphabets. The target image is received by the segmenting component 302 that divides it into a grid of segments of predetermined sizes. Thus, the segments can all be of the same size or they can be of different sizes in accordance with different aspects. The color generation component 304 selects/generates a set of colors to be used in manipulating the segmented target image. The set of colors is generated such that the pixel data of the target image is manipulated based on a property of the human eye, namely, simultaneous contrast detailed supra. Accordingly, an embodiment of the color generation component 304 can generate a set comprising three colors for manipulation of the segmented target image.

As mentioned supra, the method involved intends to make the raw data ambiguous while relying on qualities of human visual interpretation to extract relevant meaning from the generated video. Therefore, in order to be indistinguishable from each other, the amount of positive data is made equal the amount of negative data within the segmented target image by the frameset generation component 306. Careful use of colors that complement each other per the contrast effect, by the color generation component 304, will ensure that the positive and negative data are visually differentiable while being numerically ambiguous. The frameset generation component 306 therefore receives as input the segmented target image from the segmentation component 302 and the color set from the color generation component 304 to generate a CAPTCHA that can effectively distinguish human users from automated entities.

Figure 4:
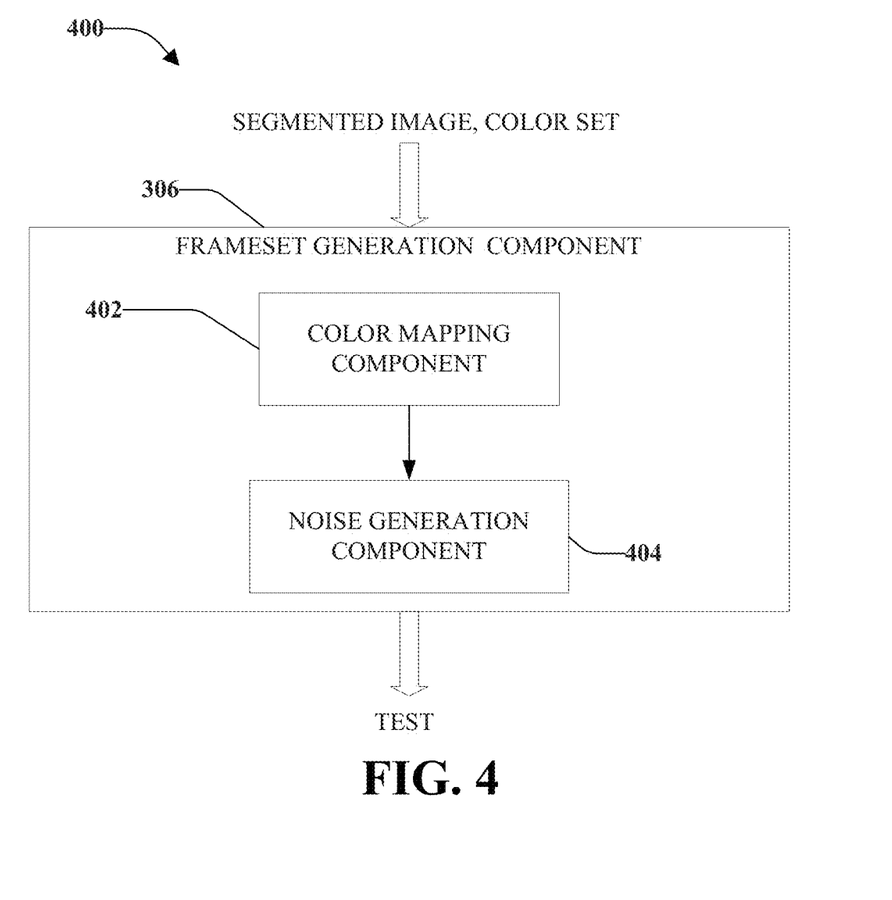
FIG. 4 is another schematic figure of the frameset generator according to a more detailed aspect disclosed herein.

FIG. 4 is another schematic FIG. 400 of the frameset generation component 306 according to a more detailed aspect. The frameset generation component 306 comprises a color mapping component 402 and a noise generation component 404. Again, it can be appreciated that the various components are shown as separate entities as means of illustration and not limitation and that the functionality ascribed to these components can be achieved by more or less number of components.

A set of sequential frames that contain most or all the image/text data to be interpreted is a frameset. A frameset vector is the vector of pixels across a frameset for an (x,y) coordinate. The number of frames per frameset (FPFS) will depend on the frames per second (FPS) for the text to be decipherable. Given an appropriate FPFS, the human eyes and brain will be able to put together the information in each frame to form the image data/text. The target image can comprise both positive data and negative data. The positive data can be the pixels in the image that should stand out in the video, for example, the text. The negative data can include the remaining part of the image.

If a frameset is composed of positive data and negative whitespace, even though the positive data is split across frames, it can be easily recombined into the target image. Thus, negative nonwhitespace data (noise) must be inserted into the frameset. In addition, for the positive data to be decipherable, it must be displayed approximately every 0.05 seconds. However, the negative noise cannot obstruct the positive information in the final video. Finally, if there is more positive data than negative data, or vice versa, it would be possible to attempt the differentiation between the positive and negative data which could lead to the extraction of the target image. Thus, the occurrence rates of the positive and negative data should be the same, thus making the noise indecipherable from the relevant information.

As discussed supra, simultaneous contrast turns what are actually three colors into four visible colors. Thus, using simultaneous contrast, exemplary embodiments discussed herein create a video that has a balance of positive and negative data using three unique colors while maintaining positive data visibility. Based on the aforementioned criteria of balancing positive and negative data, the color mapping component 402 determines which pixels of the target image are positive and where to put negative data prior to generating the frameset. The sizes of the data segments that get distributed among frames in the frameset are also pre-determined. Employing the color set that produces the simultaneous contrast effect $\{c_-, c_0, c_+\}$, the color mapping component 402 produces the frameset wherein the target image is divided into segments of positive and negative data that includes the colors from the color set $\{c_-, c_0, c_+\}$. One embodiment uses a target image of size 104×44 pixels wherein the image is divided into 26 vertical segments and 11 horizontal segments, resulting in a video displayed at 60 FPS with 4 FPFS. The color mapping component 402 balances positive and negative color information while reducing the amount of information in a frameset so that the text cannot be reconstructed by automated entities.

The following example of pseudo code can be employed by the color mapping component 402 for generating the frameset:

```
For each segment, s, of target image {
    Choose a random frame, frameset[f]
    Choose a starting y from {0,1},y_start
    Choose a step amount for y from {1, 2, 3},y_step
    For each y pixel from y_start of s, incrementing by y_step {
        For each x pixel of s{
            value of pixel(x,y,s) of frameset[f] += 1/2(c_o - value)
            For the pixel above and below{
                If pixel(x,y,s) of target image is positive {
                    value of pixel(x,y,s) of frameset[f] +=1/2(c_+ - value)
                }
                Else if pixel(x,y,s) of target image is negative {
                    value of pixel(x,y,s) of frameset[f] += 1/2(c_- - value)
                }
            }
            Choose a random color from {c_-, c_+, c_o}, c'
            Choose a random frame other than frameset[f], frameset[f']
            value of pixel(x,y,s) of frameset[f'] += (c' - value)
        }
    }
}
```

The target image is initially divided into a specific number of segments and, for each segment, a random frame of the frameset, frameset[f], is choosen to which to write the segment's pixels. The value of the corresponding pixel is then changed in the chosen frame per the equation:

$$\text{value of pixel}(x,y,s) \text{ of frameset}[f] += \tfrac{1}{2}(c_0 - \text{value})$$

Then, for the pixels above and below the written pixel, the value is changed based on whether the written pixel was positive or negative per the equations:

$$\text{value of pixel}(x,y,s) \text{ of frameset}[f] += \tfrac{1}{2}(c_+ - \text{value})$$

$$\text{value of pixel}(x,y,s) \text{ of frameset}[f] += \tfrac{1}{2}(c_- - \text{value})$$

In addition, the noise generation component 404 selects a random color, c', from $\{c_-, c_0, c_+\}$ and a random frame of the frameset frameset[f'], besides the one previously written to, and changes the value of the pixel in the chosen frame per the equation:

$$\text{value of pixel}(x,y,s) \text{ of frameset}[f'] += \tfrac{1}{2}(c' - \text{value})$$

Thus, "noise" is introduced into each segment in a deterministic way which leads to reduced visibility of the text in each frame, but which is distinguishable by a human user due to the biological properties of persistence of vision and simultaneous contrast.

Figure 5:
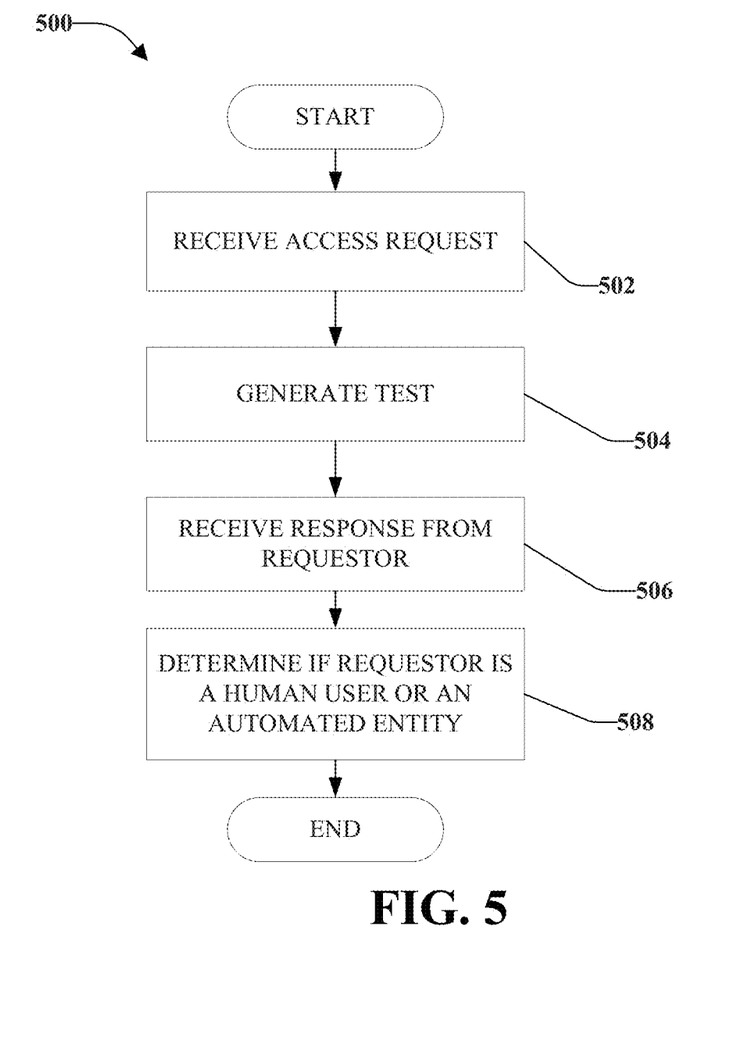
FIG. 5 is a flow chart illustrating a method of verifying humans from automated entities in accordance with at least one aspect disclosed herein.
Figure 6:
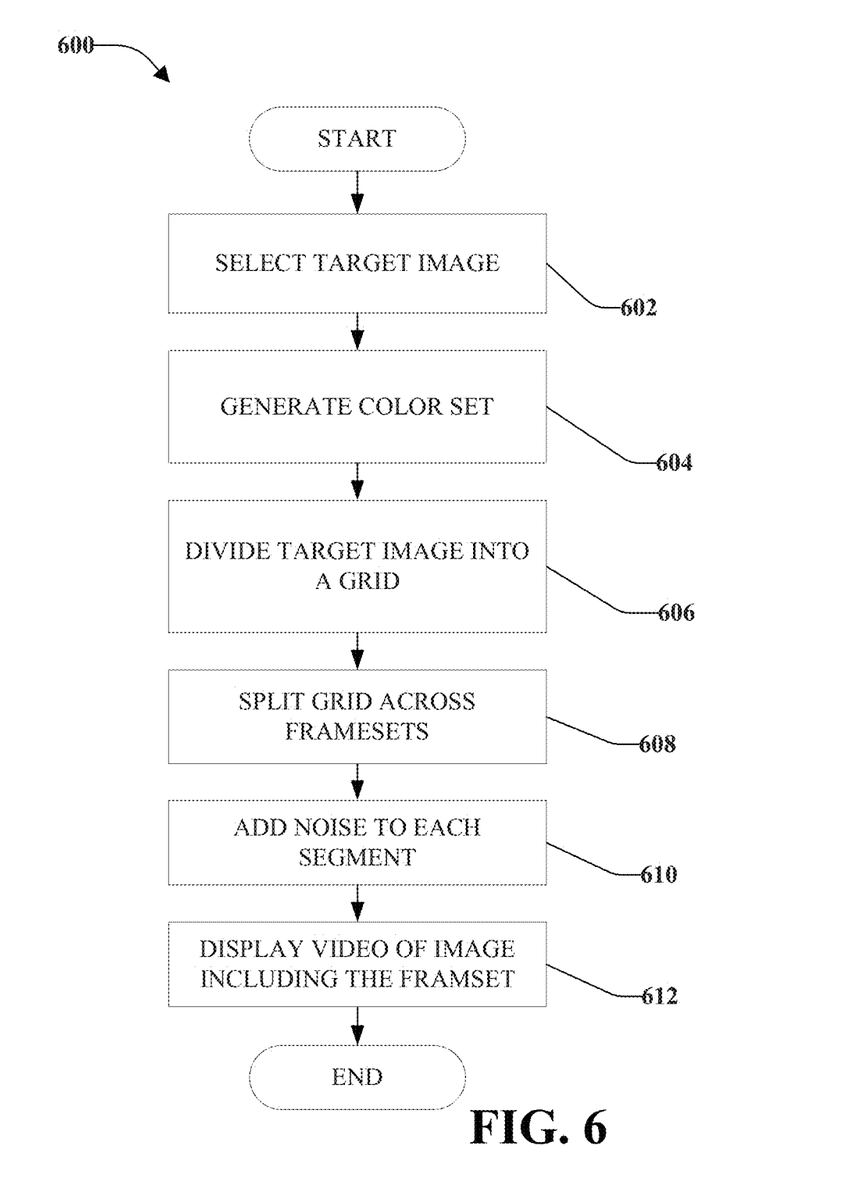
FIG. 6 is another flow chart depicting a methodology of generating a CAPTCHA in accordance with at least one aspect disclosed herein.

Referring to FIGS. 5 and 6, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 5 is a flow chart illustrating a method of permitting access to resources in accordance with an aspect of the disclosed embodiments. The method 500 begins at 502, wherein a request for access to resources is received. The request can be issued by different entities such as a human user or an automated entity such as bots. As computer programs like bots can perform repetitive tasks much faster than humans, they tend to block out access to resources for human users. Therefore, a test is generated at 504 in order to differentiate such automated entities from human users requesting access to resources. In accordance with different aspects, a CAPTCHA, or more particularly, a video CAPTCHA, can be generated in order to better distinguish different kinds of requestors. A video based CAPTCHA in accordance with different aspects detailed herein, can be configured to suit ability/characteristics of human beings so that such test will be better suited to distinguish human users from automated entities. At 506, a response to the generated test is received from the requestor. If the test generated included a video based CAPTCHA as detailed herein, the response can be a text that was included in the video. If the requestor is a human user, the CAPTCHA is designed to permit the user to be able to distinguish the target image and therefore access the resources. On the other hand, if the requestor is an automated entity, such entity would fail to distinguish the target image in the video based CAPTCHA, as it is designed particularly for human users and hence would not be able to access the resources. Accordingly, at 508, the response received from the entity is analyzed to tell a human apart from a computer.

FIG. 6 is another flow chart depicting a methodology of generating a CAPTCHA in accordance with an aspect. The flow chart 600 begins at 602 wherein a target image for display to a requestor is selected. In accordance with different aspects, the image can comprise a video of text including a grouping of randomly selected letters or it can comprise meaningful words. The video CAPTCHA generated in accordance with this aspect takes advantage of at least two biological qualities of human visual perception: persistence of vision and simultaneous contrast. Persistence of vision is the visual imprint that remains in the brain after what was seen has changed. Simultaneous contrast is the change in appearance of a color through the influence of another color in its immediate surroundings. Accordingly, a set of colors for inclusion into the target image is generated as shown at 604. At 606, the image is divided into a grid comprising a predetermined number of vertical and horizontal segments of predetermined size with positive and negative data that includes the colors from the color set. At 608, the grid of segments is split across a plurality of framesets such that occurrence rates of the positive data comprising the image/text data and negative data including the whitespace data is the same. At 610, a noise component is added to each segment in a deterministic way which leads to reduced visibility of the text in each frame, but when combined in a frameset and shown as a video CAPTCHA, a human user can identify it due to persistence of vision and simultaneous contrast properties. Accordingly, the target image after the segmentation, manipulation with the color set and inclusion of noise is displayed as a video as shown at 612.

Figure 7:
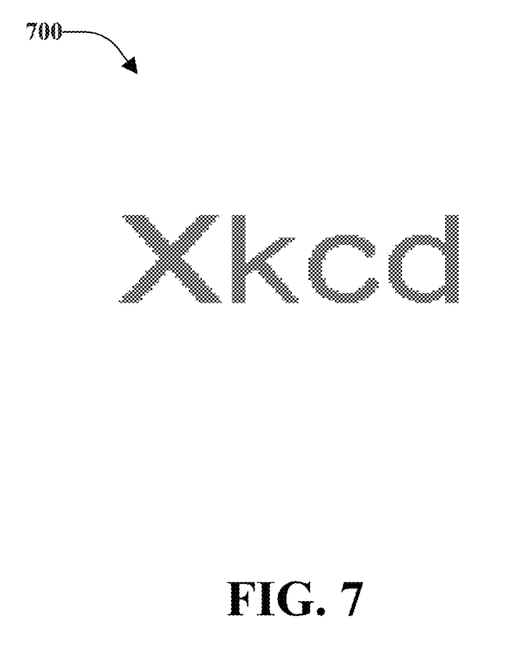
FIG. 7 shows an example of a target image from which a video CAPTCHA was generated.

FIG. 7 shows an exemplary target image 700 from which a video CAPTCHA was generated. Although the image advantageously employs random letters, meaningful words or combinations thereof are also contemplated in different aspects.

Figure 8:
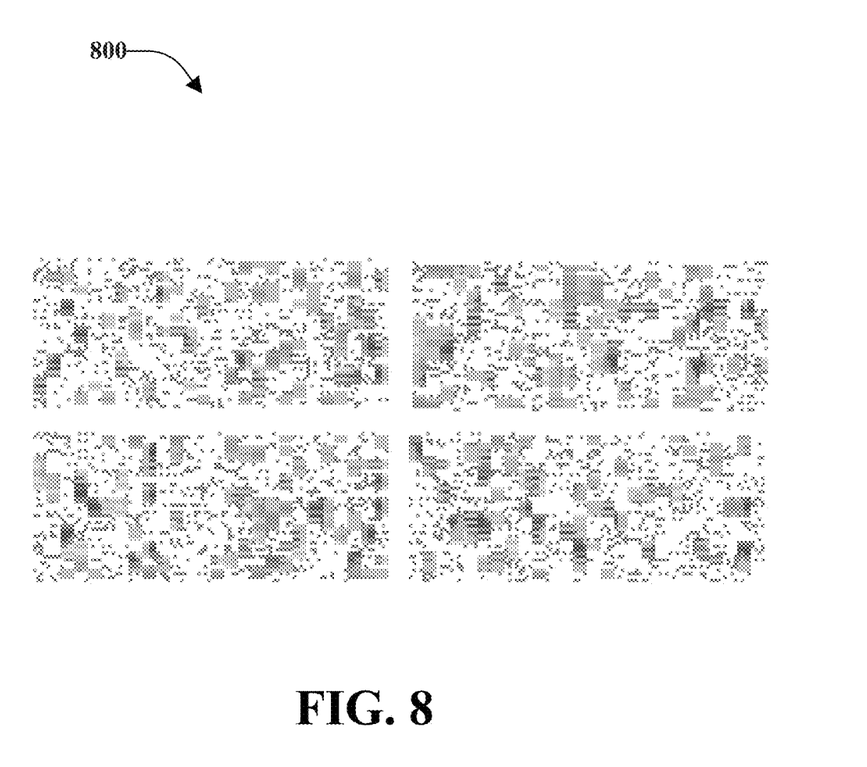
FIG. 8 depicts the resulting frameset generated in accordance with an exemplary embodiment for the target image shown in FIG. 7.

FIG. 8 shows the resulting frameset 800 generated in accordance with an exemplary embodiment for the target image shown in FIG. 7. As discussed supra, a set of sequential frames that contain most or all the image/text data to be interpreted is a frameset. A video CAPTCHA in accordance with various aspects discussed herein displays short videos consisting of frames that rely on simultaneous contrast to display information. Such frames only show part of the full text, such that the use of persistence of vision to display fractions of information per frame and simultaneous contrast to display that information will present a very difficult problem for a computer to capture. The result is therefore a very effective CAPTCHA.

Figure 9:
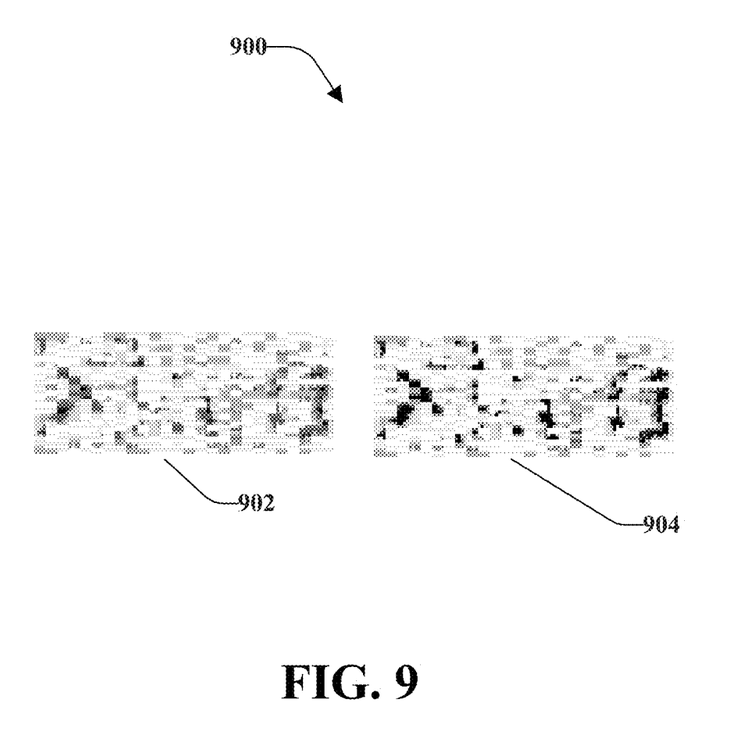
FIG. 9 shows the output of an attempt to extract relevant information from the frameset.

FIG. 9 shows the output of an attempt to extract relevant information from the frameset 800. A naïve algorithm was used that took value averages across frameset vectors resulting in the first image 902. The second image 904 shows the first image after value level adjustment. The segmentation and the effect of random noise addition can be seen in the attempted recombination. The random negative data insertions create data gaps where there should be positive pixels and add background clutter and distortion.

Figure 10:
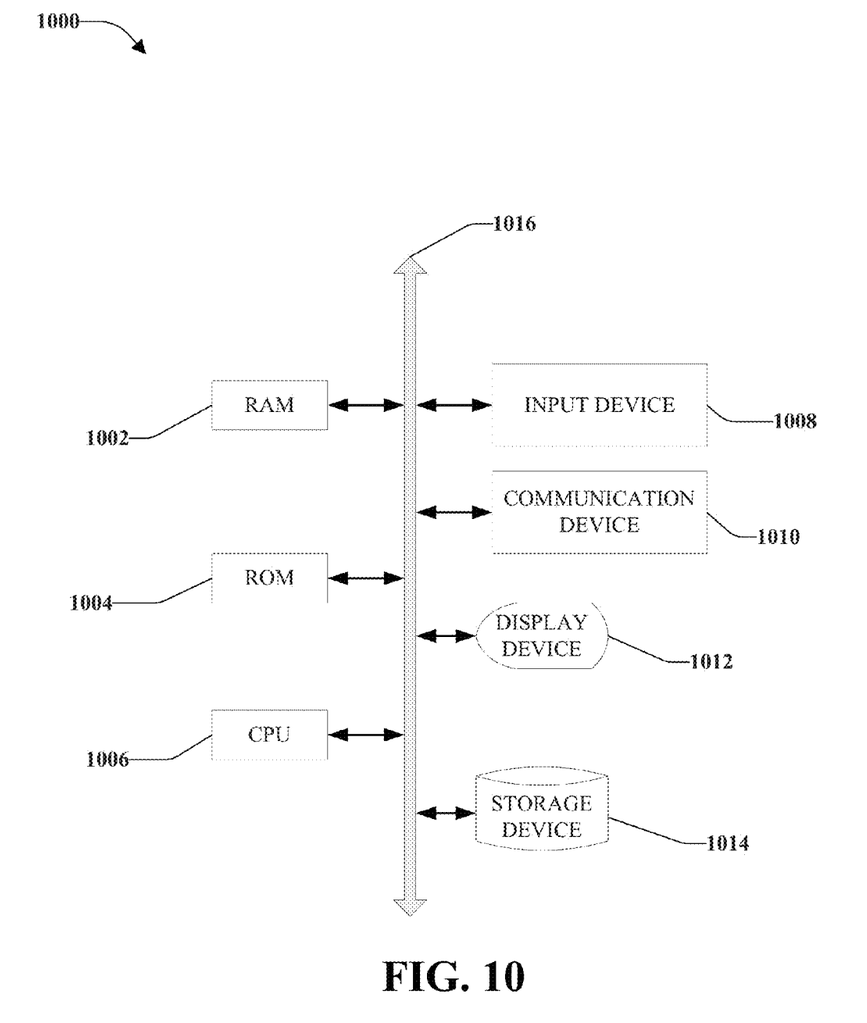
FIG. 10 is a schematic diagram of the hardware configuration of a computing device/apparatus capable of implementing various aspects described herein.

FIG. 10 is a schematic diagram of the hardware configuration of a computing device/apparatus 1000 capable of implementing various aspects described herein. The device 1000 comprises a CPU (Central Processing Unit) 1006 as the main process, a RAM (Random Access Memory) 1002 which serves as the main memory for the CPU 1006 and a ROM (Read Only Memory) 1004 on which control programs and other programs are stored. The CPU 1006, RAM 1002 and ROM 1004 are connected to each other via a bus 1016. The bus 1016 is also connected to a storage device 1014 such as an internal and/or external hard disc and/or other secondary storage devices such as a flash drive etc. A communication device 1010 facilitates bi-directional communication of the device 1000 with other devices. For example, if the device 1000 implements a security/verification component 108 in accordance with different aspects described herein, then the communication device 1010 can transmit the generated test and receive the user response to the test. On the other hand if the device 1000 is used as an access requestor, the communication device 1010 facilitates receiving the generated test and transmitting a user response to the test. An input device 1008 and a display device 1012 also connected to the bus 1016 facilitate receiving user input and display of output to the user respectively. The input device 1008 may receive user input via various modalities such as a key board, mouse, joy stick etc.

Described herein are embodiments of video CAPTCHA that rely on human visual properties to fool the attacker that relies on technology to break the CAPTCHA. CAPTCHA's are becoming tougher for humans to solve in order to defeat sophisticated attackers that keep on improvising their breaking techniques. In one embodiment, the image is simple for humans to recognize, but the information provided is insufficient for commonly used OCR techniques to crack, thereby making them useless. The various embodiments described herein involve simple implementation, and can be easily incorporated by various websites which require CAPTCHA's.

Although the systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for user verification, comprising:
a security component comprising a test generation component for generating one or more automated tests that rely on a plurality of human vision properties comprising at least persistence of vision and simultaneous contrast wherein simultaneous contrast comprises enhancement or diminishment, relative to normal, of perception, cognition and related performance as a result of immediately previous or simultaneous exposure to a stimulus of lesser or greater value in the same dimension, to differentiate a human user from an automated entity, wherein the test generation component further comprises a segmenting component which segments a target image into a grid of segments of predetermined sizes, and a frameset generation component for generating at least one frameset for at least one of the automated test, wherein the frameset generation component further comprises one or more of a color mapping component that determines which pixels of the target image are positive and where to put negative whitespace data prior to generating the frameset or a noise generation component that introduces noise into each frame of the frameset;

a communication component configured to execute one or more of transmission of the tests to one or more access requestors or reception of responses from the access requestors; and a nontransitory computer readable medium having stored thereon one or more of the security component or the communication component.

2. The system of claim 1, wherein the test generation component generates a video-based test from a target image, wherein the video-based test relies on the plurality of human vision properties for the differentiation.

3. The system of claim 2, wherein the video-based test generated by the test generation component is a Completely Automated Public Turing-test to tell Computers and Human Apart (CAPTCHA).

4. The system of claim 2, wherein the target image comprises a selection of text.

5. The system of claim 4, wherein the selection of text comprises one or more of one or more randomly selected letters or meaningful words.

6. The system of claim 1, wherein the segments are all of the same size.

7. The system of claim 1, wherein the test generation component further comprises a color generation component to generate or select a set of colors for manipulating the target image based at least on one of the plurality of human vision properties.

8. The system of claim 7, wherein the set of colors comprises at least three colors such that positive and negative data in the target image are visually differentiable while being numerically ambiguous.

9. The system of claim 1, wherein the frameset comprises equal rates of positive data along with the negative whitespace data in addition to negative non-whitespace data.

10. The system of claim 9, wherein the positive data occurs every 0.05 seconds.

11. The system of claim 1, wherein the test generation component generates the target image of size 104×44 pixels wherein the target image is divided into 26 vertical segments and 11 horizontal segments, resulting in the video being displayed at 60 FPS with 4 FPFS.

12. A method of user verification employing a processor operating to perform actions in response to executing computer program instructions, comprising:

receiving an access request;

generating, by a nontransitory computer readable medium having stored thereon instructions for generating, one or more video-based automated tests that are based on at least two properties of human vision comprising at least persistence of vision and simultaneous contrast wherein simultaneous contrast comprises enhancement or diminishment, relative to normal, of perception, cognition and related performance as a result of immediately previous or simultaneous exposure to a stimulus of lesser or greater value in the same dimension wherein generating the one or more video-based automated tests further comprises generating a video of a target image comprising text data of one or more of randomly selected letters or meaningful words, segmenting the target image into a grid of segments wherein each segment is of a predetermined size, generating a set of colors for inclusion into the target image in the video, and splitting the grid of segments across a plurality of framesets such that occurrence rates of the positive data comprising the target image or the text data and negative data including the whitespace data is the same;

issuing the one or more tests;

receiving a response to the one or more tests from the access requestors; and verifying that the access request originated from a human user based at least on the response.

13. The method of claim 12, wherein the set of colors is generated such that positive and negative data in the target image are visually differentiable while being numerically ambiguous.

14. The method of claim 12, wherein generating a set of colors comprises generating a set of three or more colors that exploits simultaneous contrast characteristic of human vision.

15. The method of claim 12, further comprising adding a noise component to each segment in a deterministic way which leads to reduced visibility of the text in each frame, but identifiable by a human user when combined in a frameset and shown as a video CAPTCHA.

16. A nontransitory computer readable medium having stored thereon instructions for:

generating one or more video-based automated tests that are based on at least two properties of human vision comprising at least persistence of vision and simultaneous contrast wherein simultaneous contrast comprises enhancement or diminishment, relative to normal, of perception, cognition and related performance as a result of immediately previous or simultaneous exposure to a stimulus of lesser or greater value in the same dimension generating a video of a target image comprising text data of one or more of randomly selected letters or meaningful words;

segmenting the target image into a grid of segments of predetermined sizes;

splitting the grid of segments across a plurality of framesets such that occurrence rates of the positive data comprising the target image or the text data and negative data including the whitespace data is the same;

receiving a response to the one or more tests; and verifying that the response is from a human user.

17. The computer readable medium of claim 16, further comprising instructions for generating a set of colors for inclusion into the target image in the video.

18. The computer readable medium of claim 17, further comprising instructions for generating the set of colors such that positive and negative data in the target image are visually differentiable while being numerically ambiguous.

19. The computer readable medium of claim 17, further comprising instructions for generating the set with three or more colors that exploit simultaneous contrast characteristic of human vision.

20. The computer readable medium of claim 16, further comprising instructions for including the positive data within the frameset such that the positive data occurs every 0.05 seconds in the video of the target image.

21. The computer readable medium of claim 16, further comprising instructions for adding a noise component to each segment in a deterministic way which leads to reduced visibility of the text in each frame, but identifiable by a human user when combined in a frameset and shown as a video CAPTCHA.

22. A system for user verification, comprising:

a security component comprising software operable to confirm that an access request is received from a human rather than an automated program, the security component comprising a test generation component comprising software operable to generate one or more automated tests that rely on a plurality of human vision properties to differentiate a human user from an automated entity, the test generation component comprising a segmenting component which segments a target image into a grid of segments of predetermined sizes and a frameset generation component for generating at least one frameset for at least one of the automated tests, wherein the frameset generation component comprises one or more of a color mapping component that determines which pixels of the target image are positive and where to put negative whitespace data prior to generating the frameset or a noise generation component that introduces noise into each frame of the frameset;

a communication component comprising software configured to execute one or more of transmission of the tests to one or more access requestors or reception of responses from the access requestors; and a nontransitory computer readable medium having stored thereon one or more of the security component or the communication component.

23. A method of user verification employing a processor operating to perform actions in response to executing computer program instructions, comprising:

receiving an access request;

generating, by a nontransitory computer readable medium having stored thereon instructions for generating, one or more automated tests, at least one of the tests comprising a video-based automated test comprising a video of a target image comprising text data of one or more of randomly selected letters or meaningful words, further comprising segmenting the target image into a grid of segments wherein each segment is of a predetermined size, generating a set of colors for inclusion into the target image in the video, and splitting the grid of segments across a plurality of framesets such that occurrence rates of positive data comprising the target image or the text data and negative data including whitespace data is the same;

issuing the one or more tests;

receiving a response to the one or more tests from the access requestors; and verifying that the access request originated from a human user based at least on the response.

24. A nontransitory computer readable medium having stored thereon instructions for:

generating one or more video-based automated tests comprising a video of a target image comprising text data of one or more of randomly selected letters or meaningful words, segmenting the target image into a grid of segments of predetermined sizes, and splitting the grid of segments across a plurality of framesets such that occurrence rates of positive data comprising the target image or the text data and negative data including whitespace data is the same;

receiving response to the one or more tests; and verifying that the response is from a human user.

* * * * *